United States Patent [19]

Ewald

[11] 4,202,248
[45] May 13, 1980

[54] ROTARY VALVE

[75] Inventor: Jerome T. Ewald, South Bend, Ind.

[73] Assignee: The Bendix Corporation, Southfield, Mich.

[21] Appl. No.: 892,441

[22] Filed: Mar. 31, 1978

[51] Int. Cl.² .................................................. F15B 9/10
[52] U.S. Cl. ............................ 91/375 A; 180/145; 180/149; 137/625.23
[58] Field of Search ............. 91/375 A, 368; 180/145, 180/146, 132, 141, 142, 143, 144, 145, 146, 148, 149, 150; 137/625.21, 625.23

[56] References Cited

U.S. PATENT DOCUMENTS 3,896,702  7/1975  Shah ................................... 91/375 A
3,935,790  2/1976  Goff ................................... 91/375 A Primary Examiner—Alan Cohan
Attorney, Agent, or Firm—Leo H. McCormick, Jr.; Ken C. Decker

[57] ABSTRACT

A rotary valve for use in a steering control of an integrated brake and steering system. The rotary valve has a pinion with a first end fixed to a housing and a second end to which a lever arrangement is attached. The pinion has a series of grooves located on its surface and whenever the lever arrangement is moved, the grooves control the flow of fluid to a piston. Thereafter, movement of the piston by the fluid creates a rotary torque that is supplied to a steering gear to aid in the operation of the steering system.

6 Claims, 6 Drawing Figures

ROTARY VALVE

BACKGROUND OF THE INVENTION

Hydraulic brake boosters, such as disclosed in U.S. Pat. No. 3,831,491, have been proposed for general use in vehicles because of their compactness and reliability. In such brake boosters, the input force from the operator, which is modified through a ratio changer, moves a valve to allow a proportional volume of fluid under pressure to actuate the wheel brakes of the vehicle.

In order to maintain the number of components attached to the drive train of the motor of the vehicle at a minimum, it was suggested as disclosed in U.S. Pat. No. 3,838,629, that a portion of the output of the pump that supplies the power steering gear be diverted to operate the hydraulic brake booster.

In a further effort to better utilize the space available under the hood of vehicles, U.S. patent application Ser. No. 670,513 discloses a single housing for retaining both a hydraulic brake booster and a power steering gear. A flow control valve in the housing, in response to a brake actuator signal, diverts a portion of the output of the pump away from the rotary valve in the steering gear to provide the hydraulic brake booster with a power assist.

In another integrated brake and steering system, as disclosed in U.S. patent application Ser. No. 832,135, a single valve was adapted to operate in translatory and rotational modes to control the communication of pressurized fluid to a valve system and/or a steering system corresponding to independent operator brake and steering signals.

In another integrated brake and steering system, as disclosed in U.S. patent application Ser. No. 882,716, an integral control mechanism was developed having a rotary valve for regulating the communication of fluid to the steering system concentrically located in a spool valve that regulated the communication of fluid to the brake system.

Even though the known integrated brake and steering mechanisms performed in an adequate manner, because of space limitations between the steering shaft and brake pedal linkage, they have not been universally accepted for all vehicles. Thus, a steering control mechanism, as disclosed in copending U.S. patent application Ser. No. 892,051 was developed to permit an integrated brake and steering power assist mechanism to be remotely positioned with respect to the power steering shaft.

SUMMARY OF THE INVENTION

I have devised a rotary valve mechanism for use in a remotely positioned integrated brake and steering power assist mechanism that provides a steering shaft with a rotational force in response to an operator steering signal as does the integrated mechanism disclosed in copending application Ser. No. 892,051.

The power assist mechanism has a housing with a first bore therein for retaining the rotary valve and a second bore for retaining a movable piston. The first bore is connected to a source of fluid under pressure, the second bore and a reservoir for the source of fluid. The rotary valve has a first end attached to the housing and a second end that extends through the housing. A series of grooves and slots in the rotary valve controls the flow of fluid through the first bore.

A carrier member attached to the second end of the rotary valve has first and second arms that hold first and second sprockets, respectively, in contact with the chain that connects a pinion of the movable piston with a gear fixed to the steering shaft.

A steering signal applied to the steering shaft by an operator puts tension on the chain between the gear on the steering shaft and one of the first and second sprockets. The tension on the chain causes the carrier member to rotate the rotary valve and restrict the communication of fluid from the source to develop a pressure differential across the piston. When the pressure differential reaches a predetermined level, the piston moves a rack to produce a rotational torque in a pinion. Thereafter, this rotational torque is transmitted through the chain to the gear on the steering shaft to provide a power assist in the operation of the steering gear connected to the wheels of the vehicle.

It is an object of this invention to provide an integrated brake and steering system with a rotary valve that controls the development of a power assist torque to augment a manual steering signal in the operation of a steering gear connected to the wheels of a vehicle.

It is another object of this invention to provide a rotary valve in a steering mechanism with an actuator mechanism responsive to the tension in a chain through which an operational power assist is transmitted to a steering shaft. This operational power assist and a manual steering input is transmitted into a steering gear through the steering shaft which controls the movement of the wheels of a vehicle.

It is a further object of this invention to provide an integrated control for a power assist brake and steering system with a rotary valve having a pinion with slots and grooves therein for controlling the communication of fluid to a movable member through which the steering system is provided an assist in controlling the movement of the wheels of a vehicle.

These and other objects should be apparent from reading this specification and viewing the drawings.

DETAILED DESCRIPTION OF THE INVENTION

Figure 1:
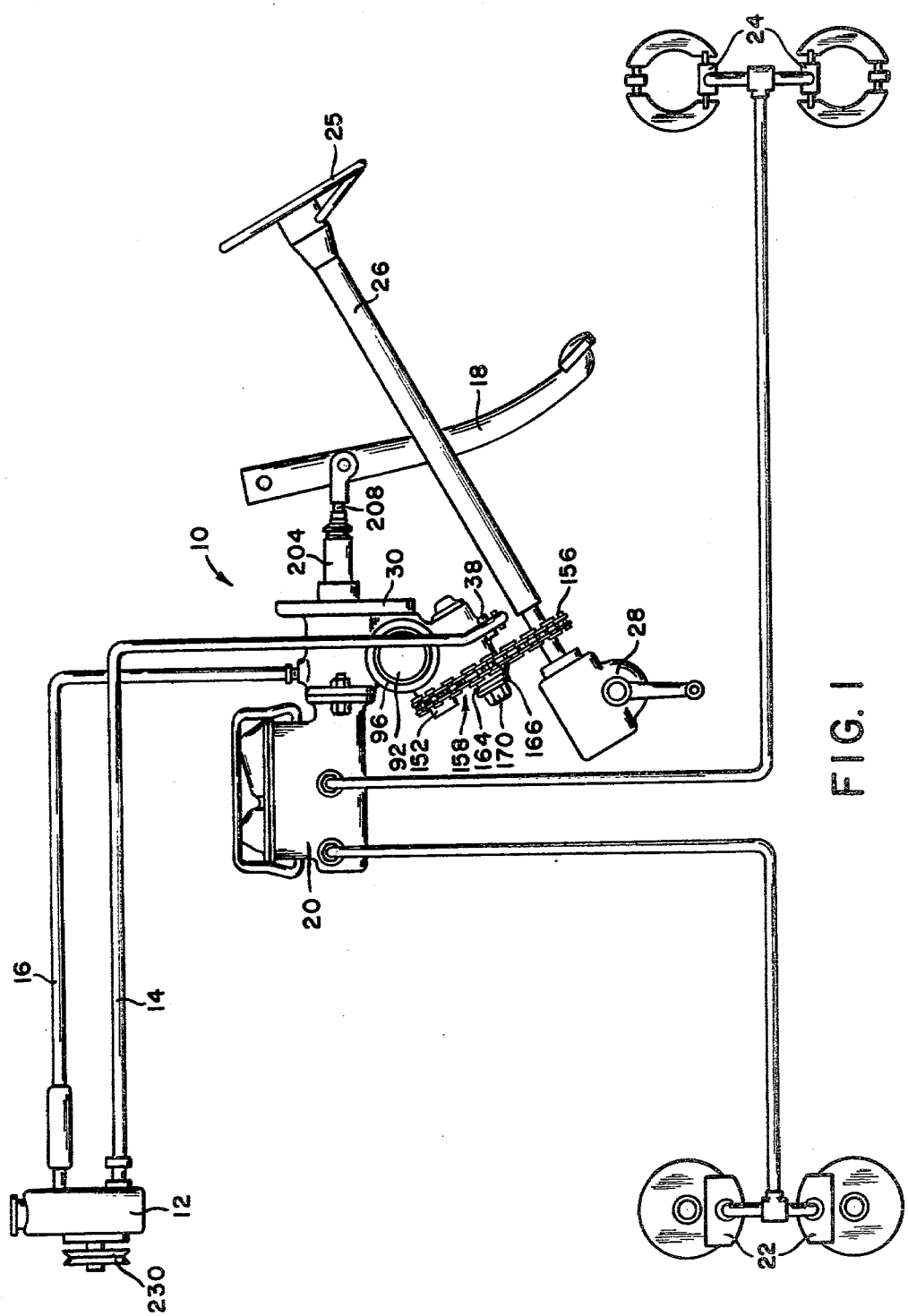
FIG. 1 is a schematic illustration of a control mechanism made according to the teachings of this invention in an integrated brake and steering system of a vehicle.

The integrated brake and steering systems shown in FIG. 1 has a control mechanism 10 which is connected to a hydraulic pump 12 by a supply conduit 14 and a return conduit 16.

In response to a brake input force applied to brake pedal 18 by an operator, the control mechanism 10 is operated to provide master cylinder 20 with an input force sufficient to effect a brake application of the front and rear wheel brakes 22 and 24, respectively.

In response to a steering input force applied to the steering shaft 26, the control mechanism 10 is operated to provide an additional rotative force to operate the steering gear 28 and correspondingly move or turn the wheels of the vehicle.

Figure 2:
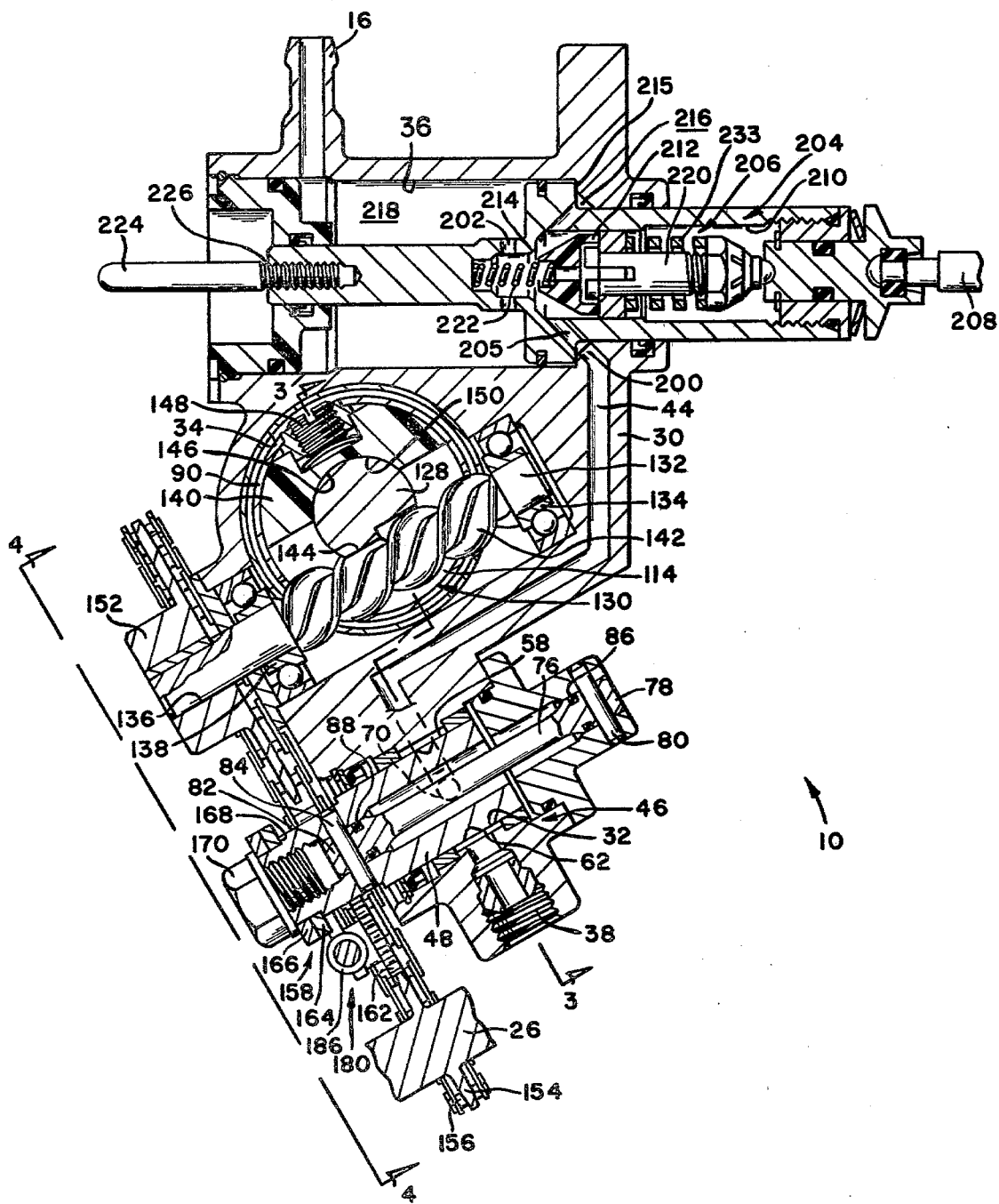
FIG. 2 is a sectional view of the control mechanism of FIG. 1.

In more particular detail, as shown in FIG. 2, the control mechanism 10 has a housing 30 with a first bore 32, a second bore 34 and a third bore 36 located therein. The first bore 32 is connected to the supply conduit 14 by port 38, to the second bore 34 through passageways 40 and 42, see FIG. 3, and to the third bore 36 through passageway 44.

A rotary valve member 46 located in the first bore 32 regulates the communication of the fluid from port 38 to the first, second and third passageways 40, 42 and 44, respectively.

Figure 3:
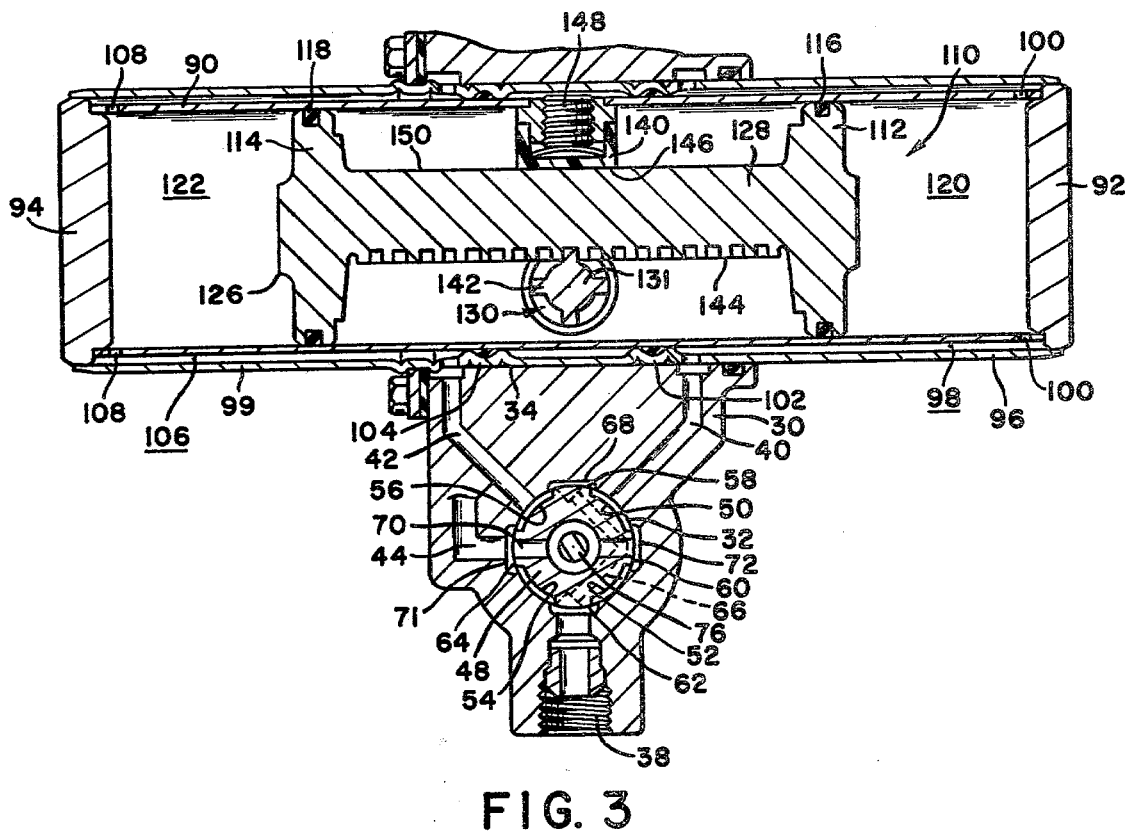
FIG. 3 is a sectional view taken along line 3—3 of FIG. 2.

The rotary valve member 46 includes a sleeve 48 which has a series of slots 50, 52, 54 and 56 located between ribs 58, 60, 62 and 64, see FIG. 3, the first cross bore 66 which connects port 38 with cavity 68 in housing 30 adjacent bore 32, and a second cross bore 70 that connects return passage 72 with the third passageway 44. A torsion bar 76 has a first end 78 fixed to housing 30 by a pin 80 and a second end 82 fixed to the sleeve 48 by pin 84. Seals 86 and 88 which surround the torsion bar 76 prevent fluid, which flows from return passage 72 to the third passageway 44 through cross bore 70, from leaking to the surrounding environment. The torsion bar 76 normally holds the sleeve 48 in a position as illustrated in FIG. 2, such that fluid flows from port 38 through cross bore 66 to cavity 68. The volume of fluid in cavity 68 is divided with approximately one-half flowing to groove 58 and the other half flowing to groove 56 for communication to the second bore 34 through passageways 40 and 42, respectively.

A tubular member or sleeve 90 as illustrated in FIG. 3 is positioned and held in bore 34 by end caps 92 and 94 attached to projections 96 and 99, respectively, extending from housing 30. Sleeve 90 cooperates with projection 96, rib 102 and end cap 92 to establish a flow path 98 between passage 40 and radial openings 100 adjacent end cap 92, and with 99, 98, rib 104 and end cap 94 to establish a flow path 106 between passageway 42 and radial openings 108 adjacent end cap 94.

A piston 110 having a first cylindrical member 112 separated from a second cylindrical member 114 by a rock 128 is located within the sleeve 90. The first cylindrical member 112 cooperates with sleeve 90 and end cap 92 to define a first chamber 120 while cylindrical member 114 cooperates with sleeve 90 and end cap 94 to define a second chamber 122 within the housing 30. Cylindrical members 112 and 114 have bumpers 124 and 126 located thereon which engage end caps 92 and 94, respectively, and prevent the interruption of fluid communication to chambers 120, 122 from flow paths 98 and 106 during movement of the piston 110 within the sleeve 90. Seals 116 and 118 on cylindrical members 112 and 114, respectively, prevent communication of fluid between the first chamber 120 and the second chamber 122.

A pinion member 130 as shown in FIG. 2 has a shaft 131 with a first cylindrical portion 132 journalled in bearing 134 fixed in housing 30 and a second cylindrical portion 136 which extends through bearing 138 to a position external to housing 30. The pinion member 130 has a plurality of teeth 142 which mesh with teeth 144 on the rack 128 to convert linear movement of the piston 110 into rotary movement of the pinion shaft 131.

An indexing member 140 which is attached to sleeve 90 by screw 148 has a face 146 that engages surface 150 of rack 128. The indexing member 140 holds teeth 144 into engagement with teeth 142 to prevent stripping of these teeth by bowing of the rack 128 during movement of the piston 110 by the difference in fluid pressure between the first chamber 120 and the second chamber 122.

Figure 4:
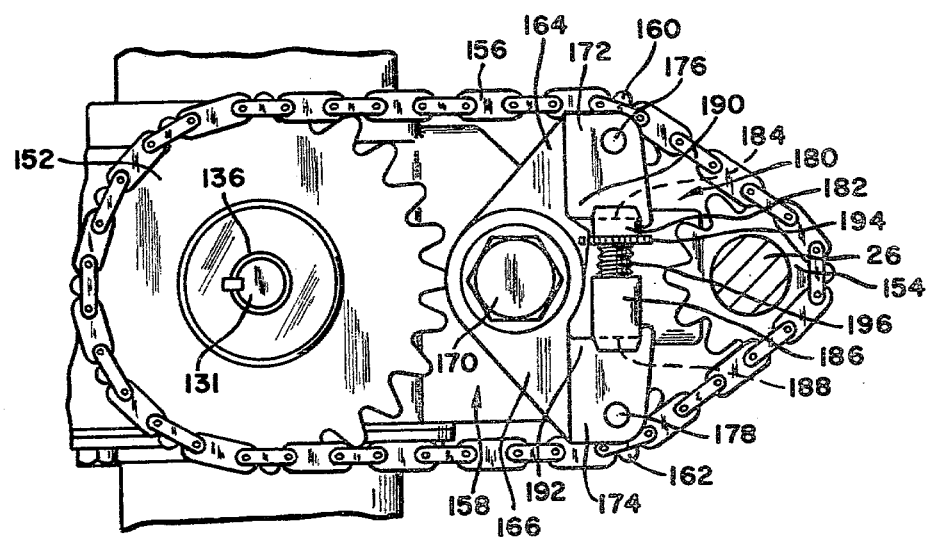
FIG. 4 is a view taken along line 4—4 of FIG. 2.

A driver gear 152, as best shown in FIG. 4, which is fixed to the end of the second cylindrical portion 136 of shaft 131 transfers rotary movement of the pinion member 130 to gear 154 fixed to the steering shaft 26 through chain 156.

A carrier member 158 which is fixed to the rotary valve 46 holds sprockets 160 and 162 taut against the chain 156 to assure that movement of gear 152 is directly transferred to gear 154 on shaft 26.

The carrier member 158 has a first arm 164 and a second arm 166 positioned against shoulder 168 on sleeve 48 by threaded stud 170. The end 172 of the first arm 164 is offset with respect to shoulder 168 in order that sprocket 160 is aligned with chain 156. Similarly end 174 is offset with respect to shoulder 168 in order to align sprocket 162 with chain 156.

Sprockets 160 and 162 are attached to arms 164 and 166, respectively by pins 176 and 178.

A tensioning member 180 as best shown in FIG. 4, FIG. 4, has a first cylindrical member 182 with a slot 184 on the end thereof and a second cylindrical member 186 with a slot 188 located on the end thereof. A projection 190 on arm 164 is located in slot 184 and a projection 192 on arm 166 is located in slot 188. A pawl wheel 194 on threaded stem 196 which is attached to cylindrical member 186 has internal threads therein. By moving pawl wheel 194 with respect to cylindrical member 186 the sprocket wheels 160 and 162 increase the tension on chain 156 as arms 164 and 166 pivot on sleeve 48. When the desired tension is achieved and slots 58 and 62 are centered with respect to port 38 and chamber 68, stud 170 is tightened to fix the position of the arms 164 and 166 with respect to the rotary valve 46 to allow fluid from the pump to freely flow from port 38 to passage 44 in the absence of a steering signal.

The fluid in passage 44 enters bore 36 through port 200 and passes through passages 202 in piston 204 before returning to the reservoir in pump 12 by conduit 16.

Flow of fluid through passage 202 is regulated by the brake control valve 206 which is fully disclosed in U.S. Pat. No. 3,967,536 is connected to push rod 208 attached to the brake pedal 18.

Control valve 206 has a poppet member 212 connected to push rod 208 through bolt 220 of a spring cage mechanism 213. Return spring 222 connected to piston 204, holds the poppet 212 away from seat 214 to allow the fluid to freely flow into chamber 218 from chamber 216. Piston 204 is attached to push rod 224 through a threaded connection 226.

MODE OF OPERATION OF THE INVENTION

When the engine in a vehicle equipped with a pump 12 is operating, a belt from the crankshaft continually rotates pulley 230 to produce a fluid flow in supply conduit 14.

The fluid in conduit 14 is presented to port 38 in the control mechanism 10 through which the brake and steering systems in the vehicle are provided with a power assist.

The fluid flows through port 38 around rib 62 along a first flow path to passage 44 and through cross bore 66 in a second flow path to passageway 44.

In the first flow path, fluid flows through either slot 52 to cross bore 70 or slot 54 for communication to return cavity 71.

In the second flow path, the fluid in cavity 68 flows around rib 58 for distribution through slot 50 to passageway 40 and slot 56 to passageway 42. With the flow of fluid from cavity 68 unrestricted, the fluid pressure in chambers 120 and 122 are equal. The entire fluid flow from cavity 68 flows through either slot 56 to return cavity 71 or slot 50 to cavity 72 for distribution to return cavity 71 through cross bore 70.

Thus, the same volume of fluid that enters port 38 is flowing in passageway 44 to the control valve 206. The fluid enters bore 36 by flowing into chamber 216 through port 200. Piston 204 has a series of passages 205 through which the fluid is communicated to passage 202 to chamber 218 for return to the reservoir by conduit 16.

When the operator desires to effect a brake application, an input force applied to brake pedal 18 is transmitted through push rod 208 to the control valve 206. Movement of the control valve restricts the flow of fluid through passage 202 by moving poppet 212 toward seat 214 causing a pressure differential to occur between chambers 216 and 218. This pressure differential acts on piston face 215 and moves the piston 204 toward chamber 218. When piston 204 moves toward chamber 218, a force is developed and transmitted through push rod 224 to operate the master cylinder 20 and provide the front and rear wheel brakes 22 and 24 with pressurized fluid to effect a brake application.

When sleeve 48 is rotated, the flow communication from port 38 through cavity 68 is restricted to one of the passages 40 and 42 while the other of the passages 40 and 42 is opened to receive the full pump pressure. However, the passage through which the flow from cavity 68 is restricted, is proportionally opened to passage 44 going to the reservoir.

The full pump pressure, is transmitted through one of passages 40 and 42 depending on the direction desired to turn, 42 for left and 40 for right, to the corresponding pressure chamber 120 or 122. Since the pump pressure is on one side of the piston 110 and the other side is communicated to the reservoir, a pressure differential is created. This pressure differential acts piston 110 and moves the piston 110 toward the chamber in free communication with the reservoir through passage 44. When piston 110 moves, teeth 144 on rack 128 engage teeth 142 and rotate pinion 130. Rotation of pinion 130 causes gear 152 to rotate and provide chain 156 with an operational force. This operational force is transmitted through chain 156 to gear 154 to provide shaft 26 with a power assist in operating steering gear 28 that turns the wheels of the vehicle.

Assume that the piston 110 and the sleeve 48 are each in neutral positions relative to the housing 30, as shown in FIG. 3. With sleeve 48 and piston 110 in this neutral position, the fluid pressure in chambers 120, 122 is balanced. Should the operator desire to make a change in the direction the vehicle is traveling, a steering input is applied by rotating steering shaft 26 and gear 154 through wheel 25. Since gear 152 is initially stationary, the rotation of gear 154 produces tension in one portion of chain 156 and slack in the other portion. For example, if gear 154, when viewed as in FIG. 4, is rotated counterclockwise, this rotation produces tension in the portion of chain 156 which engages sprocket 162 and arm 166 while producing slack in the portion of chain 156 which engages sprocket 160 and arm 164. This tension acts on arm 166 to cause counterclockwise rotation of stud 170 and thus, sleeve 48, to an angularly displaced position relative to housing 30, against the resilient tension of torsion bar 76.

It should be noted that the tension in chain 156 does not merely produce a force which acts on arm 166 in a direction parallel to chain 156 since sprocket 162 would freely rotate in response to such a force without arm 166 pivoting at stud 170. Instead, the tension in chain 156 produces a force which acts on arm 166 in a direction normal to the portion of chain 156 which engages sprocket 162. It is a component of this normal force which causes arms 166 and 164 and stud 170 to rotate counterclockwise even though the portion of chain 156 on gear 152 does not initially move.

The counterclockwise rotation of sleeve 48 to this angular displaced position opens passage 40 to inlet 38 while opening passage 42 to the outlet passage 44. This causes a differential pressure in chambers 120, 122 which moves piston 110 to the left to a displaced position relative to housing 30, when viewed as in FIG. 3. This movement of piston 110 provides the power assist in the steering system through the counterclockwise rotation of pinion 130 on rack 144. The counterclockwise rotation of pinion 130 produces counterclockwise rotation of gear 152, when viewed as in FIG. 4.

This counterclockwise rotation of gear 152 and chain 156 relieves the tension in the portion of chain 156 which engages sprocket 162 and arm 166. The relief of the chain tension eliminates the normal force on sprocket 162 and arm 166 which caused their initial counterclockwise rotation. Then, under the influence of torsion bar 76, arms 164, 166, stud 70 and sleeve 48 rotate clockwise back to their initial neutral position with respect to housing 30, while gears 152, 154 and chain 156 remain displaced counterclockwise from their initial positions. If sprockets 160, 162 were not allowed to rotate freely about pins 170, 178 on arms 164, 166, then this clockwise rotation of sleeve 48 in response to counterclockwise rotation of gear 152 would not be possible.

When sleeve 48 has returned to its initial neutral position with respect to housing 30, the fluid pressure in chambers 120, 122 is once again balanced. This pressure balance maintains the piston 110, gear 152, chain 156 and gear 154 in their displaced positions until the vehicle operator applies a new steering signal by rotating shaft 26 to yet another position.

Figure 5:
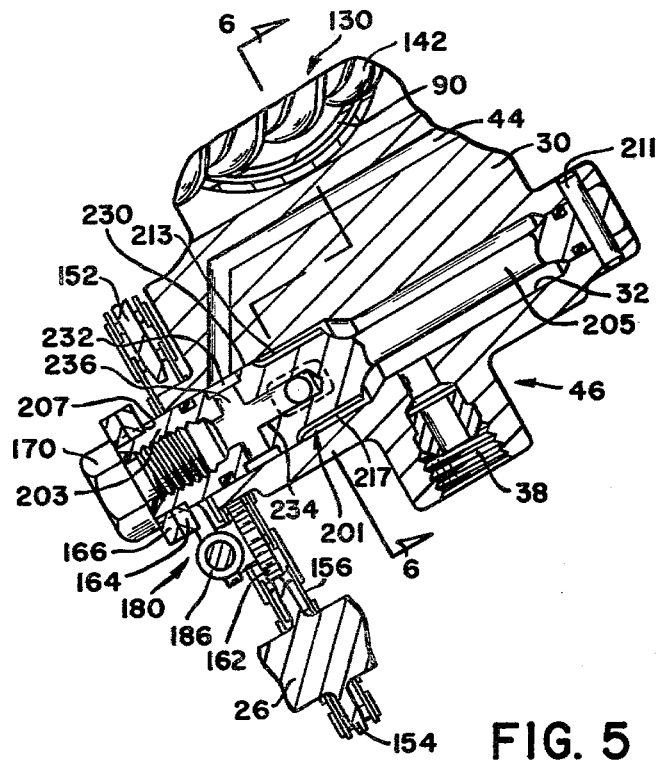
FIG. 5 is a sectional view of a secondary embodiment of a rotary valve arrangement for use in the control mechanism shown in FIG. 2.

For some application, the sleeve and torsion bar of the rotary valve 46 can be combined into a unitary structure 201, as shown in FIG. 5.

The unitary structure 201 has a cylindrical body with a first diameter section 202 and a smaller second diameter section 205. The first diameter section 203 which extends through the housing 30 has a shoulder 207 thereon for aligning sprockets 160 and 162 on arms 164 and 166, respectively, of the carrier member 158 with chain 156. After tensioning member 180 is adjusted by moving pawl wheel 194 to separate the sprockets 160 and 162 and thereby put the proper tension on chain 156, stud 170 is tightened to fix the carrier member 158 to cylindrical body. A pin 211 extends through the second diameter section 205 to fix the cylindrical body to housing 30 and align slots 213, 215, 217 and 219 with slots 221, 223, 225 and 227 in housing 30. A land 230 on the first diameter section 202 of the cylindrical body separates slots 221, 223, 225 and 227 from groove 232 aligned with passageway 44. The cylindrical body has an axial bore 234 that connects radial bore 236 aligned with groove 232 with a radial bore 238 aligned with slots 215 and 219.

The unitary structure 201 responds to a steering input force applied to the steering shaft as follows:

Rotation of gear 154 on the steering shaft 26 puts a portion of the chain 156 in tension between gear 154 and gear 152. The tension in the chain 156 acts on either arm 162 or arm 164 to create rotational torque on the carrier member 158 and the unitary structure 201. The rotational torque places the smaller second diameter section 205 in a rotational bending moment that opposes the steering signal. As the bending moment is placed in the smaller second diameter 205, lands 240, 242, 244, 246 restrict the flow of the fluid from port 38 to one of the first and second passageways 40 and 42 and opens the other of the first and second passageways 40 and 42 to receive the full output of pump 16. At the same time, the passageway 40 or 42 through which the communication with pump 16 has been restricted is opened to passageway 44. The full pump output is communicated to the pressurizing chamber 120 or 122 associated with the steering signal (chamber 120 for a left turn and chamber 122 for a right turn) while the other chamber is communicated to the relief passageway 44 to develop a pressure differential across piston 110. The pressure differential causes piston 110 to move and through the engagement of rack 128 with pinion 130 provide drive gear 152 with rotational torque. This rotational torque is transmitted through chain 156 to provide gear 154 with an assist in the operation of steering gear 28 connected to the wheels of the vehicle.

Figure 6:
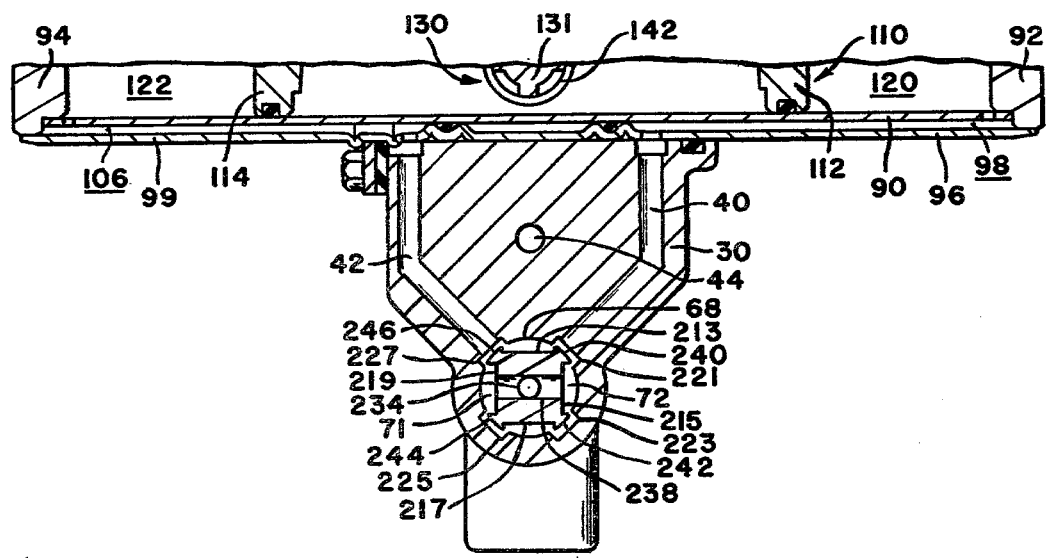
FIG. 6 is a sectional view taken along line 6—6 of FIG. 5.

The rotation of driver gear 152 and the chain 156 relieves the tension on chain 156, and the resiliency of the second diameter section 205 of the cylindrical body rotates lands 240, 242, 244 and 246 back to the trim position shown in FIG. 6. In this position, the fluid flow from inlet port 38 is equally divided through slots 213, 215, 217 and 219 for distribution to passageway 44 by way of radial bore 238, axial bore 234 and radial bore 236. At the same time, the pressure differential across piston 110 is eliminated since the pressure in passages 40 and 42 and correspondingly chambers 120 and 122 are equal. This pressure balance maintains the piston 110 in this position corresponding to the rotation of steering shaft 26 until such time as a new steering signal is applied to shaft 26.

I claim:

1. In a vehicle having an integrated control mechanism for controlling the development of independent power assist to augment an operator input in the operation of a brake system and a steering system, a rotary valve mechanism for the steering system comprising:

a housing having a bore therein with a inlet connected to a source of fluid pressure, first and second operational ports, and an outlet connected to a reservoir;

a torsion bar with at least a portion thereof located in said bore, said torsion bar having a first end fixed to said housing and a second end, said torsion bar including an annular rib on the peripheral surface thereof, said rib engaging the wall of said bore to prevent communication of fluid from the inlet to the outlet along the wall of said bore, said torsion bar also including an axial bore and first and second radial bores, said first radial bore communicating said axial bore with said outlet and said second radial bore communicating said axial bore with said inlet and with said operational ports, said torsion bar further including a plurality of slots on the peripheral surface thereof, said fluid pressure being communicated from the inlet to the outlet on paths through said slots, said axial bore, and said first and second radial bores; and an actuation member connected to said second end of the torsion bar, said actuation member responding to an operator steering input to rotate said torsion bar to restrict the communication of fluid pressure from the inlet to one of said first and second operational ports while opening the communication of fluid pressure from the outlet to the other of said first and second operational ports to develop a power assist for the steering system.

2. A power steering system with a rotary valve comprising:

a housing having first and second bores and means for communicating said bores with a fluid pressure source, with a fluid reservoir and with operational passages;

a piston movable in said first bore and cooperating with said housing to divide said first bore into first and second pressure chambers, each of said chambers communicating with a respective one of said operational passages;

a rotary valve member in said second bore for rotating to regulate said fluid pressure within said first and second pressure chambers, said valve member including an annular rib on a peripheral surface thereof, said rib cooperating with said housing to divide said second bore into axially spaced apart third and fourth chambers, said third chamber communicating with said fluid reservoir, and one of said third and fourth chambers communicating with said first and second pressure chambers, said valve member including a plurality of lands and slot which cooperate with a wall of said second bore in said one chamber to create a restrictive flow condition between said fluid pressure source and one of said operational passages, said valve member rotating in response to an operator steering signal from a neutral position to an angularly displaced position with respect to said housing to create said restrictive flow condition and to create a pressure differential between said first and second pressure chambers, said piston moving in response to said pressure differential from a neutral position to a displaced position with respect to said housing to provide a power assist in the operation of said steering system; and feedback means responsive to said movement of said piston for returning said rotary valve member to said neutral position with respect to said housing to eliminate said pressure differential and to thereby maintain said piston in said displaced postion, said feedback means comprising linkage means between said piston and said rotary valve member, and said feedback means comprising a torsion bar with one end fixed relative to said housing and with another end fixed to said rotary valve member.

3. The power steering system of claim 2, wherein: said rotary valve member in integrally formed with said torsion bar.

4. A rotary valve comprising:

a housing defining a bore therewith, said housing having an inlet passage for communicating said bore with a source of fluid pressure, an outlet passage for communicating said bore with a reservoir, and a pair of operation passages communicating with said bore; and a unitary rotary valve member rotatably mounted in said bore for controlling communication of said fluid pressure to said operational passages, said valve member including an integrally formed cylindrical valve portion and a torsion bar portion, an end of said torsion bar portion being fixed relative to said housing, said torsion bar portion controlling the angular position of said valve portion with respect to said housing, said valve portion having an annular rib on a peripheral surface thereof, said rib cooperating with said housing to divide said bore into first and second chambers, said first chamber communicating with said outlet passage, said second chamber communicating with said inlet passage, and one of said chambers communicating with said operational passages, said valve portion including lands and slots which cooperate with a wall of said bore in said one chamber to control communication of said fluid pressure source with said operational passages.

5. The rotary valve of claim 4, wherein:
said valve portion includes an axial bore, a first radial bore for communicating said axial bore with said first chamber, and a second radial bore for communicating said axial bore with said second chamber.

6. A power steering system with a rotary valve comprising:

a housing having first and second bores and means for communicating said bores with a fluid pressure source, with a fluid reservoir and with operational passages;

a piston movable in said first bore and cooperating with said housing to divide said first bore into first and second pressure chambers, each of said chambers communicating with a respective one of said operational passages;

a rotary valve member in said second bore for rotating to regulate said fluid pressure within said first and second pressure chambers, said valve member including an annular rib on a peripheral surface thereof, said rib cooperating with said housing to divide said second bore into axially spaced apart third and fourth chambers, said rib including an axially facing annular suface exposed to fluid in said third chamber and including an oppositely facing surface exposed to fluid in said fourth chamber, said third chamber communicating with said fluid reservoir, and one of said third and fourth chambers communicating with said first and second pressure chambers, said valve member including a plurality of lands and slots which cooperate with a wall of said second bore in said one chamber to create a restrictive flow condition between said fluid pressure source and one of said operational passages, said valve member rotating in response to an operator steering signal from a neutral position to an angularly displaced position with respect to said housing to create said restrictive flow condition and to create a pressure differential between said first and second pressure chambers, said piston moving in response to said pressure differential from a neutral position to a displaced position with respect to said housing to provide a power assist in the operation of said steering system; and feedback means responsive to said movement of said piston for returning said rotary valve member to said neutral position with respect to said housing to eliminate said pressure differential and to thereby maintain said piston in said displaced position, said feedback means comprising linkage means between said piston and said rotary valve member, and said feedback means comprising a torsion bar with one end fixed relative to said housing and with another end fixed to said rotary valve member.

* * * * *